(No Model.)

A. HUNTER.
DUST ARRESTING AND COLLECTING DEVICE.

No. 419,954. Patented Jan. 21, 1890.

Witnesses
Geo. W. Young.
Maurice F. Frear.

Inventor
Andrew Hunter
By Stout & Underwood,
Attorneys

UNITED STATES PATENT OFFICE.

ANDREW HUNTER, OF MILWAUKEE, WISCONSIN.

DUST ARRESTING AND COLLECTING DEVICE.

SPECIFICATION forming part of Letters Patent No. 419,954, dated January 21, 1890.

Application filed April 25, 1887. Serial No. 235,980. (No model.)

*To all whom it may concern:*

Be it known that I, ANDREW HUNTER, of Milwaukee, in the county of Milwaukee, and in the State of Wisconsin, have invented certain new and useful Improvements in Dust Arresting and Collecting Devices; and I do hereby declare that the following is a full, clear, and exact description thereof.

My invention relates to devices for arresting, separating, and collecting the dust arising from grain in the different stages of milling, and will be fully described hereinafter, and pointed out in the claims.

Figure 1:
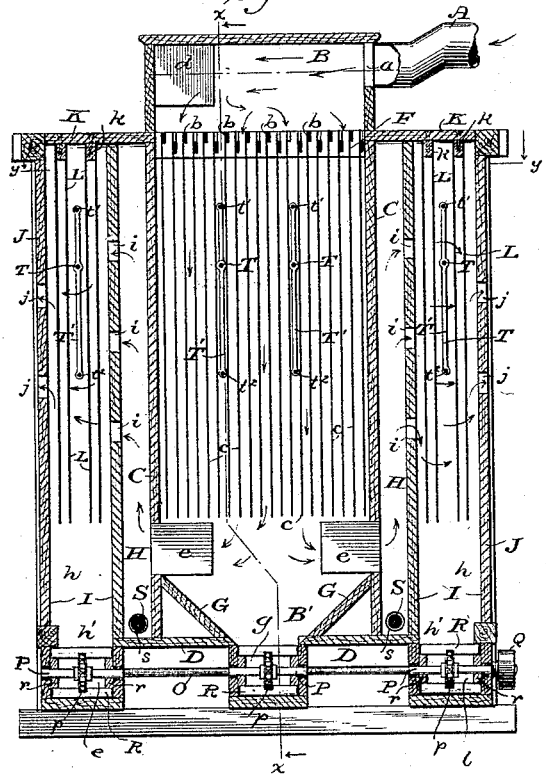
Figure 2:
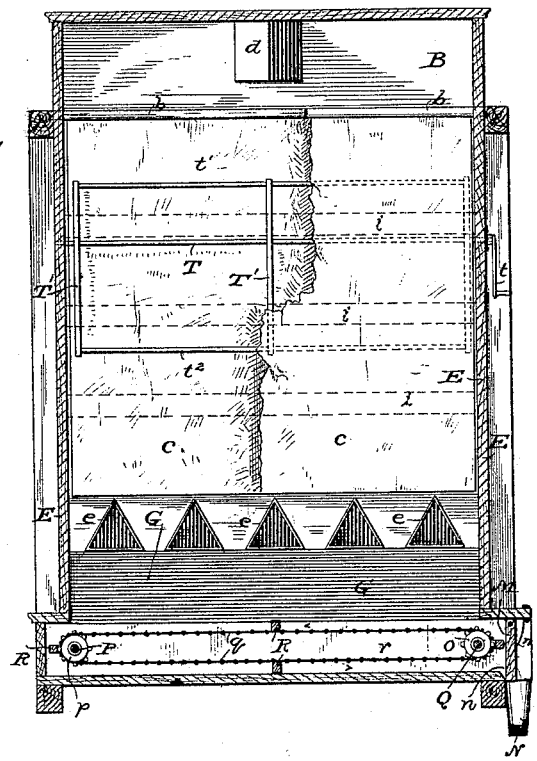

In the drawings, Figure 1 is a transverse vertical section of my dust-collecting device. Fig. 2 is a vertical section on the line $xx$, Fig. 1; and Fig. 3 is a horizontal section on the line $yy$ of said Fig. 1.

A represents an air-passage leading from the fan (not shown) through opening $a$ into the upper part B of an air-chamber, whose side walls C C extend down to a floor D near the bottom of the device. Upon the inside of the end walls E E of this chamber B (which walls extend the entire width of the machine) are secured two boards F F at a point a little below the entrance of the passage A, which boards are slotted from the top downward, as shown at $f$, the slots being alternately deep and shallow, and into these slots are dropped the ends of strips $b\ b$, from which are suspended pieces of shaggy cloth, (such as burlap) $c\ c$. These strips $b\ b$ are shown wholly black in Fig. 1, and thus it will be seen by their alternate higher and lower arrangement that air-passages will be formed between them to receive and guide the currents of air that enter through the opening $a$ from passage A, which currents first strike against the deflector $d$ opposite $a$, and are thereby divided and spread, as shown. Below these cloths $c\ c$ are openings, preferably triangular, in the walls C C, continued by means of short correspondingly-shaped pipes $e\ e$, and below these are inclines G G, leading to a central dust-trough $g$, between which inclines below the pipes $e\ e$ is formed a settling-chamber B'.

The pipes $e\ e$ lead into narrow air-passages H H, formed between the walls C C and other walls I I, which latter have transverse openings $i\ i\ i$, leading, in turn, to air-chambers $h$ $h$ between the walls I I and outer walls J J, which likewise have transverse openings $j\ j$, leading to the outer air.

Figure 3:
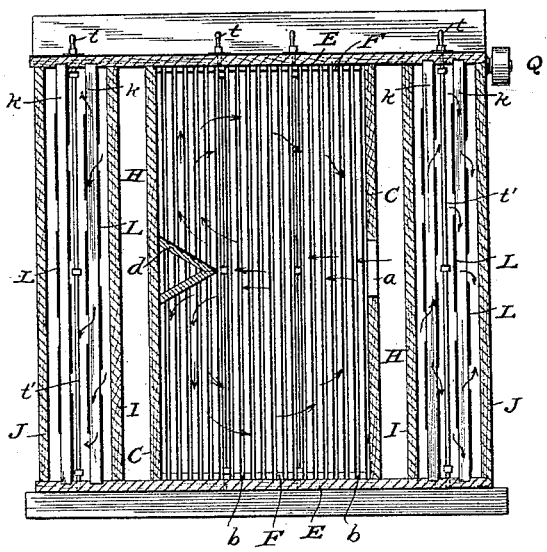

Secured by screws or otherwise to the top boards K, or with their ends inserted in mortises cut in the end boards E between the walls I and J, are strips $k$, from each side of which are suspended series of narrow pieces of shaggy cloths L L, (of the same material as the cloths $c\ c$,) so arranged that said cloths L L shall "break joints" with each other, as best shown in Fig. 3, said cloths hanging down in the air-chambers $h\ h$, at the bottom of which are dead-air chambers $h'\ h'$, and below these are the dust-troughs $l\ l$.

The dust-troughs $l\ l$ and $g$ have all hinged doors M at one end, normally held closed by springs $m$, and their floors are beveled off at this point, as shown at $n$, and lead to suitable spouts N.

O is a long shaft extending the entire width of the machine, parallel with the wall E, and driven by power applied to a pulley Q at one end.

P P P are short shafts extending only across the dust-troughs in suitable bearings, the shafts O and P having sprocket-wheels $o$ and $p$, respectively, connected by sprocket-chains $q\ q\ q$, to which at intervals are secured dragging-blocks R R, while the chains are kept the proper distance apart and prevented from sagging by side strips $r\ r$, over and under which the ends of the dragging-blocks R R travel.

Openings may be made in the lower part of the end walls of the chambers H, as shown at S, for the purpose of cleaning out any dust or accumulations of matter, with suitable doors or stoppers $s$ to them, and I provide oscillating knocking-frames between the suspended cloths $c\ c$ and L L at intervals, consisting of shafts T, journaled in the walls E E, and having suitable crank-handles $t$ secured to one projecting end, and to the shaft T uprights T' are secured with cross-bars $t'\ t^2$, the latter being at the greater distance from the shaft T, so that the device may properly hang vertically when at rest.

The operation of my machine is very simple. The dust-laden air from the fan is driven through the passage A into the upper part of the chamber B, and is spread by the deflector d over all parts of the chamber, and thence it passes downward between the hanging shaggy cloths c c to the pipes e e and out into the narrow air-passages H H, and up through the perforations i i i in the walls I I into the chambers h h, and strikes against the narrow strips of cloth L L, and is deflected and passes in and out between them, as shown by the arrows in Fig. 3, (freeing itself of dust all the time by contact with the various shaggy cloths,) and finally passes out into the outer air through the perforations j j in the outer walls J J. When the dust on the cloths has accumulated to any extent, it falls down into the dust-troughs l g l, and thence is dragged out to the spouts N by the dragging-blocks R R on the sprocket-chains q q, the action of the said dragging-blocks R serving to open the vertically-suspended springclosed doors M by their direct pressure on the accumulated dust between them and said doors, the said doors yielding only to this direct pressure from the said dragging-blocks, and not being opened by gravity or weight of the accumulated dust, and hence will always remain closed, preventing the escape of air from the dust-trough, no matter how much dust may have gathered, until the direct pressure of the blocks causes the springs m to yield. The preferred shape of the pipes e e guards against the dust collecting on them, and at any time the crank-handles t t can be reciprocated by hand, causing the knocking-frames to dislodge any dust remaining on the hanging cloths. While I have shown secondary air-passages on each side of the main air-chamber B, it will be understood that I may in certain cases have such secondary passages on one side only, though usually I prefer to divide the currents of air, as shown. By forming settling-chambers B' h' h' at the bottom of the chambers B h h the collection and retention of dust therein are facilitated, and the air which passes out through the openings above said settling-chambers is freer from dust than would be the case if the openings were at the bottom. The dust falling in a body has sufficient gravity to pass through the currents of air escaping through the openings, and hence all save the lightest particles will drop down to the settling-chamber B', and that which does pass through the pipes e e is arrested by the cloths L L in the secondary air-chambers h h.

The air which enters at the opening a in a compact body expands in chamber B, and as it enters between the strips b b it has lost its force and passes between the shaggy cloths in a light current, which allows the dust to adhere to the shaggy cloths, and as it reaches the space below said cloths the air takes a transverse course and escapes through pipes e e.

Having thus fully described my invention, what I claim as new, and desire to secure by Letters Patent, is—

1. In a dust arresting and collecting device, the combination, with an air-chamber the upper part of which forms an expansion-chamber having a passage leading thereto, of series of cloths suspended in the air-chamber below the expansion-chamber, and a settling-chamber below said cloths, the said air-chamber having outlets above said settling-chamber, whereby the dust-laden air enters the air-chamber above the suspended cloths and passes down between them and out, substantially as set forth.

2. In a dust arresting and collecting device, the combination of a main air-chamber and a secondary air-chamber, the former having a series of cloths suspended therein about midway between its top and bottom and extending all the way across said chamber, and the latter having series of narrow cloths suspended at intervals from its ceiling, with spaces for the passage of air between them, and having an intermediate air-passage between the two air-chambers and communicating openings, substantially as set forth.

3. In a dust arresting and collecting device, the combination of a main air-chamber having a passage leading thereto and secondary air-chambers on each side of the main chamber, series of shaggy cloths suspended within the several air-chambers, and intermediate air-passages between the main and secondary air-chambers, the walls thereof being provided with communicating openings and the outer walls with other openings for the final escape of the air, substantially as set forth.

4. In a dust arresting and collecting device, the combination of an air-chamber the upper part of which forms an expansion-chamber having a passage leading thereto, series of cloths suspended in the air-chamber below the expansion-chamber, a settling-chamber below the cloths, a dust-trough and dust-removing device below the settling-chamber, and pipes or passage-ways in the wall of the air-chamber below the cloths and above the settling-chamber, substantially as set forth.

5. In a dust arresting and collecting device, the combination of an air-chamber, a series of cloths suspended therein, and oscillating knocking-frames pivotally suspended between said cloths at intervals, substantially as set forth.

6. In a dust arresting and collecting device, the combination of a dust-trough, an endless belt revolving horizontally within said trough and carrying dragging-blocks, and a vertically-suspended spring-closed door to prevent the escape of air from the dust-trough and adapted to be opened only by the action of said dragging-blocks pressing against the accumulated dust between them and said door, substantially as set forth.

7. In a dust arresting and collecting device, the combination of an air-chamber having air-passages leading thereto formed in one wall thereof and air-outlets formed in the opposite wall and series of narrow cloths suspended from the ceiling thereof at intervals, with spaces between them, and other series of cloths similarly suspended, but arranged so that the spaces between the separate cloths of one series shall come opposite the cloths of the adjacent series, and thereby form zigzag passages for the currents of air passing through the openings between said suspended cloths.

In testimony that I claim the foregoing I have hereunto set my hand, at Milwaukee, in the county of Milwaukee and State of Wisconsin, in the presence of two witnesses.

ANDREW HUNTER.

Witnesses:
 H. G. UNDERWOOD,
 N. E. OLIPHANT.